Figure 1:
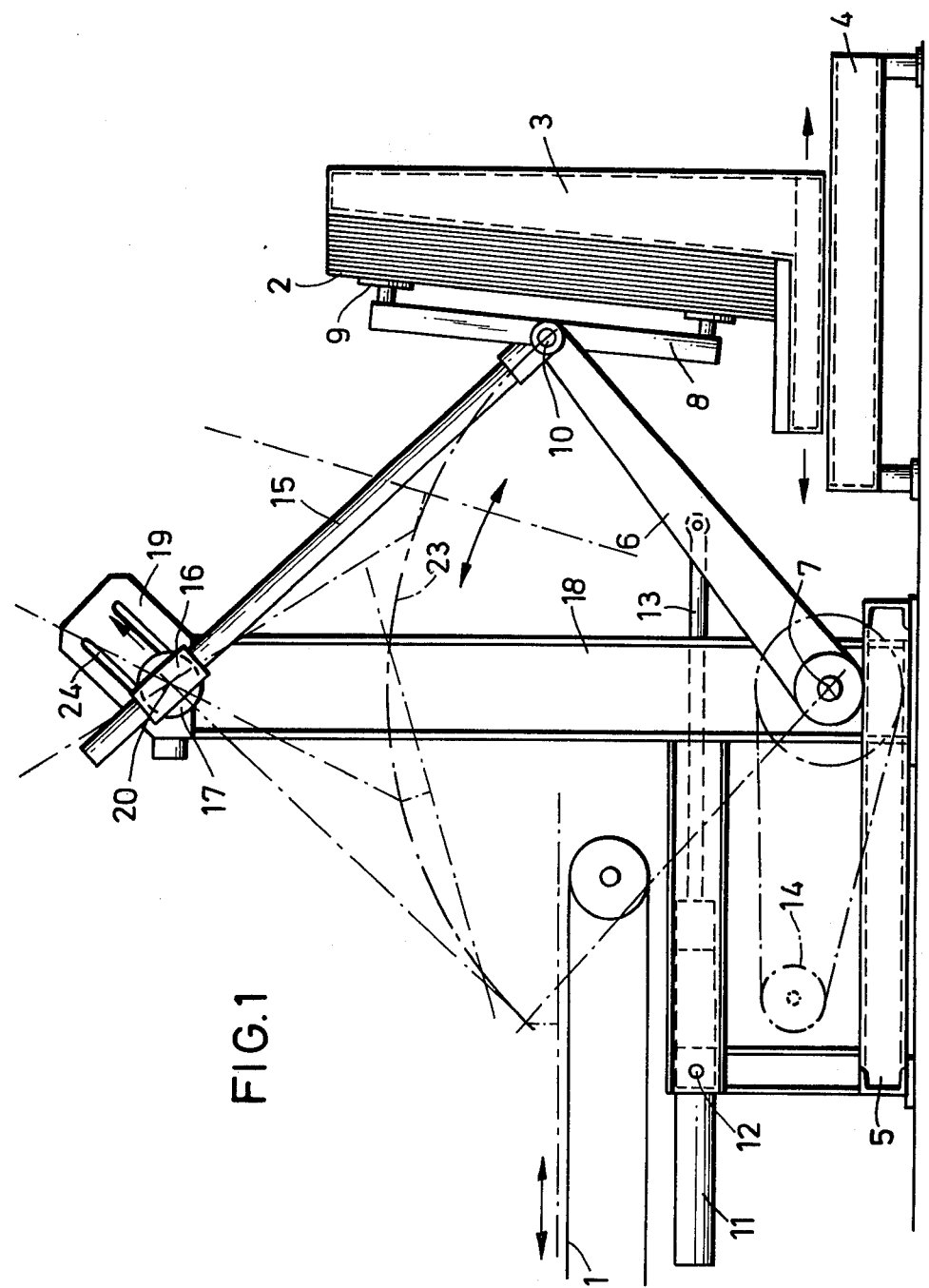

United States Patent [19]

Werner

[11] 4,444,537
[45] Apr. 24, 1984

[54] DEVICE FOR RECEIVING AND TRANSPOSING OF PLATES, IN PARTICULAR, GLASS PLATES

[76] Inventor: Johannes Werner, Schmidtheimerstrasse 1, D-5308 Rheinbach-Ramershoven, Fed. Rep. of Germany

[21] Appl. No.: 373,484
[22] PCT Filed: Aug. 7, 1981
[86] PCT No.: PCT/EP81/00116
§ 371 Date: Apr. 13, 1982
§ 102(e) Date: Apr. 13, 1982
[87] PCT Pub. No.: WO82/00628
PCT Pub. Date: Mar. 4, 1982

[30] Foreign Application Priority Data
Aug. 18, 1980 [DE] Fed. Rep. of Germany ....... 3031135

[51] Int. Cl.³ .................. B65G 49/06; B65G 57/08
[52] U.S. Cl. ............................ 414/107; 271/107; 271/194; 414/330; 414/696; 414/737
[58] Field of Search .............. 414/103, 104, 107, 121, 414/330, 696, 737; 271/12, 107, 194

[56] References Cited
U.S. PATENT DOCUMENTS 3,053,529  9/1962  Dunn .............................. 271/107
3,094,322  6/1963  Kocher et al. ................. 414/121 X
3,178,041  4/1965  Wheat .............................. 414/107

FOREIGN PATENT DOCUMENTS 946253  1/1964  United Kingdom .............. 414/737

Primary Examiner—Leslie J. Paperner
Attorney, Agent, or Firm—Michael J. Striker

[57] ABSTRACT

In a device for receiving and transposing of plates (2), in particular glass plates from a substantially horizontal position or reversed, a pivot arm (6) is pivotable around a longitudinal axis (7) into two end positions, namely into a receiving position and a release position. A support frame (8) is mounted on the pivotable end of the pivot arm (6) being pivotably mounted around a horizontal axis (10). The support frame (8) is provided with suction cups (9) for receiving a plate (2) and is forcibly guided, so that it is turned around its pivot axis (10) at an angle which is smaller than 90° during the movement of pivot arm (6) from one end position into the other. The support frame (8) is rigidly connected with a guide rod (15) disposed in a vertical plane for an exact and poor wear guide, whereby the guide rod is guided longitudinally displaceable in guide bushing (16) which is supported pivotably and a horizontal axis (20) outside of the pivot radius (23) of pivot arm (6).

9 Claims, 3 Drawing Figures

DEVICE FOR RECEIVING AND TRANSPOSING OF PLATES, IN PARTICULAR, GLASS PLATES

The invention relates to a device for receiving and transposing of plates, in particular glass plates from a substantially vertical position into a substantially horizontal position, or in reverse, with a pivot arm which is pivotable around a horizontal axis into two end positions, namely into a receiving position and into a release position and back, whereby at the pivotable end of this horizontal axis, a support arm is pivotably mounted around a horizontal axis which is provided with suction cups for receiving a plate and which is so guided that it is moved at an angle around its pivot axis which is smaller than 90° during the movement of the pivot arm from an end position into the other position.

Devices of this type are known, for example, from prospectuses of the company Grenzebach. The known devices are provided with special drives which operate the rotating of the support frame during the pivot movement of the pivot arm. The rotating drive for the support frame can be derived from cam disks and transmitted through chains onto gears which are mounted on the pivot axis of the support frame.

The known devices are disadvantageous in that the pivot drives for the support frame are relatively expensive and subject to interferences and that appearances of wear show after a long operation duration which make an exact guiding of the support frame questionable.

It is an object of the subject invention to design a device for receiving and transposing of plates, in particular, glass plates of the aforementioned type, in such a manner that after a long operation time it still operates exactly and reliably, while being of simple construction. Such a robust structure is obtained in accordance with the invention in that the support frame is rigidly connected with a guide rod which is positioned in a vertical plane and which is guided longitudinally displaceable in a guide bushing which is pivotably mounted around a horizontal axis outside of the pivot radius of the pivot arm. This device in accordance with the invention has the advantageous that the support frame is pivoted into the desired position by the guide rod during pivoting the pivot arm from the receiving position into the release position. Since the guide bushing can be located at a relative large distance from the pivot radius of the pivot arm and therefore also in a relative large distance from the pivot axis of the support frame, the guiding forces which act on the guide bushing and the guide rod are low.

Advantageously, the rotating axis of the pivot arm and the pivot axis of the guide bushing are so disposed, and the radius of the pivot radius, the pivot angle of the pivot arm as well as the angle between the plane of the support frame and the guide rod are so coordinated to the receiving position and release position of the plates, that the guide rod is disposed substantially at a right angle with respect to the pivot arm in the end positions of the pivot arm. This embodiment has the considerable advantage that the rotating movement of the support frame in the end positions of the pivot arm is at a minimum, so that, for example, the horizontal end position of the support frame can be adjusted, with limits, to the transport height of the feeding device, and that the position of the support frame in the almost vertical position can be adjusted to the pile.

Further features of the invention are stated in the claims.

The invention is explained in the following description with respect to the drawings which show exemplified embodiments.

The drawings show:

FIG. 1 a side view and

Figure 2:
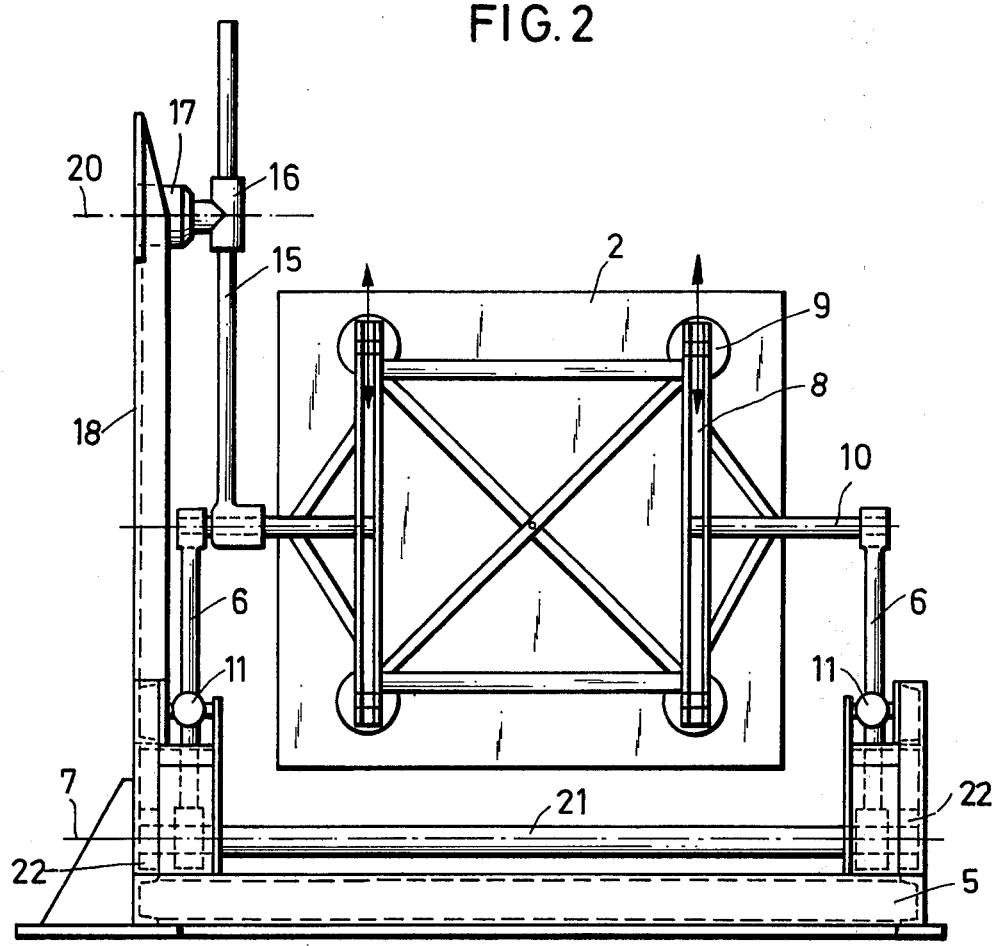
Figure 3:
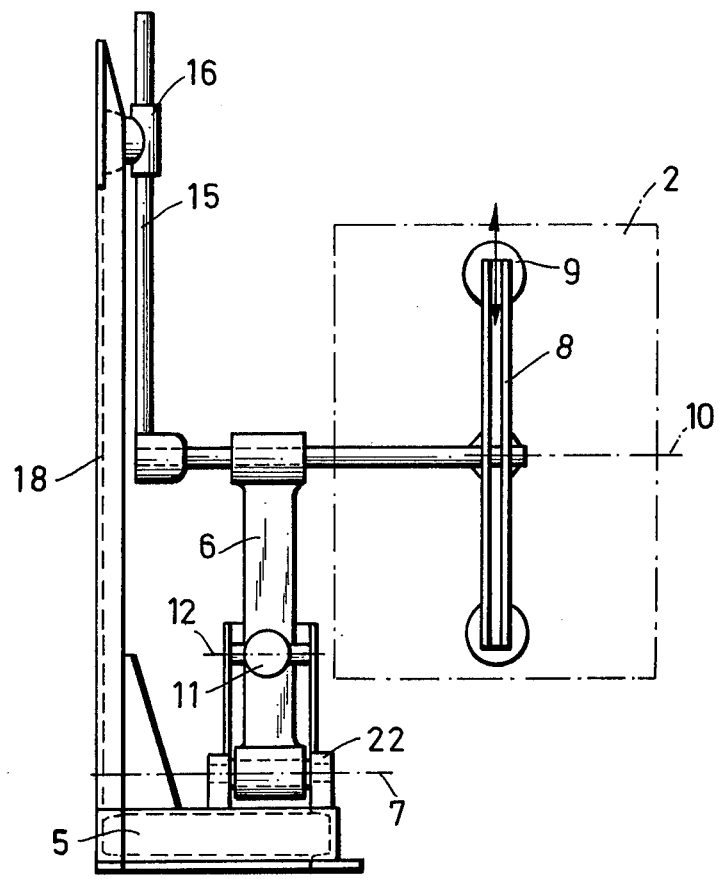

FIG. 2 a front view of the device in accordance with the invention,

FIG. 3 a front view of a modified exemplified embodiment of the device in accordance with the invention.

The device shown in FIG. 1 serves to receive substantially horizontally fed glass plates 2 from feeding device 1, for example, a conveyor or roller train and to place them onto a glass support 3 which retains the placed glass plates in a position which is somewhat inclined from a vertical position. So that the distance of the support face of the glass support 3 from the feeding device 1 remains constant, despite the growing glass pile, the glass support 3 which is mounted on its frame 4 is displaceable in feeding direction in a cycled manner in such a way that after depositing one glass plate 2, the glass support 3 is displaced in feeding direction of glass plates 2 by about the thickness of the deposited glass plate 2.

However, the device shown in FIG. 1, also serves to remove the glass plates 2 which are piled on the glass support 3 and to individually remove the glass plates 2 from the glass support 3 and to place them horizontally onto the feeding device 1.

The inventive device is provided with a machine frame 5 wherein a pivot arm 6 is pivotable around the horizontal axis 7. A support frame 8 is mounted at the upper pivotable end of the pivot arm 6 and is pivotable around the horizontal axis 10, whereby the support frame is provided with suction cups 9 for receiving the glass plates 2. The pivot arm 6 is pivotable by an angle of preferably 80° to 110° by means of a drive. A pneumatic cylinder 11 which is pivotably mounted around axis 12 in machine frame 11 and whose piston rod 13 is pivoted with the front end on pivot arm 6 serves as a drive for pivot arm 6.

Instead of the pneumatic cylinder 11, the drive can be operated with a gear motor 14 as shown with the dash-dot lines. This type of drive is less expensive.

So that during the transposition of the glass plates 2 from the feeding device 1 to the glass support or reversely, the received glass plate 2 is pivoted at an angle of less than 90°, only then when it has a sufficient large distance from the glass support 3, as well as from the feeding device, a guide rod 15 is provided which is fixedly connected with the support face 8 and is guided longitudinally displaceable in a guide bushing 16 and a horizontal axis 20 outside of the pivot radius 23.

The disposition of the pivot axis 7 of the pivot arm 6 and the pivot axis 20 of the guide bushing 16, as well as the dimension of the radius of the pivot radius 23 and the angle between the guide rod 15 and the plane of the support frame 8 are such that the guide rod 15 is substantially at a rectangular position with respect to the pivot arm 6 during the end positions of the pivot arm 6. This has the effect that the support frame 8 is pivoted only at a minimum around the axis 10 of the support frame 8 when the pivot arm 6 approaches the end positions and that the pivot movement of the support frame 8 around axis 10 substantially occurs when the pivot arm 6 travels through the center area of its pivot range.

It is also possible that the guide rod 15 does not extend from the pivot axis 10 of the support frame 8, but from another point of the support frame 8. However, the kinematics of the device changes somewhat.

In order to adjust the inventive device to the practical situations, it may be advantageous to mount the guide rod 15 in such a manner on the support frame 8 that the angle between the guide rod 15 and the plane of the support frame 8 is adjustable.

As can be seen in FIG. 2, the support frame 8 may be supported by two pivot arms 6 which are laterally mounted on the support frame 8, whereby these two pivot arms are connected with each other by means of a connecting shaft 21. The connecting shaft 21 is supported in the machine frame 5 by at least two bearings 22. In order to relieve the bearings 22 and the connecting shaft 21, it may be advantageous to drive each of the pivot arms by a pneumatic cylinder 11. The pneumatic cylinders 11 are parallel switched.

As FIG. 3 shows, a centrifugal support of the support frame 8 is possible, in particular when relative small glass plates 2 have to be transposed. In this case, it is advantageous to position the pivot arm 6 between the support frame 8 and the guide rod 15.

As FIG. 1 shows, the pivot support 17 of the guide bushing 16 is supported in a vertical post 18. A guide plate 19 is mounted on post 18 which makes it possible to displace the pivot support 17. The guide grooves 24 in this guide plate 19 extend parallel to pivot arm 6 into an end position or parallel to the tangent which extents through the other end position and through the pivot axis 10 of the support frame 8 to the pivot radius 23. By displacing the pivot support 17 along the guide grooves 24, no changes occur at the end position of the support frame 8 above feeding device 1, while the position of the support frame 8 at the support 3 changes and can therefore be adjusted to the given conditions on support 3.

I claim:

1. Apparatus for receiving and transporting of plates, in particular glass plates, comprising: a pivot arm, pivotable around a horizontal axis along a pre-determined pivot radius between a first position, in which the plates are in substantially vertical position, and a second position, in which the plates are in a substantially horizontal position, the pivot arm being arranged at an angle of 45 degrees, with respect to the horizontal axis in the first and second positions and having a pivotable end; a support frame mounted to the pivotable end and being pivotable around a further horizontal axis for receiving and transporting a respective one of the plates between the first and second positions, the support frame being pivotable around the further horizontal axis at an angle smaller than 90 degrees upon pivoting of the pivot arm between the first and second positions; a guide rod rigidly connected with the support frame for accurately guiding the support frame between the first and second positions; and a guide bushing for guiding the guide rod in a longitudinal direction thereof; the guide bushing being pivotably mounted around a still further horizontal axis beyond the pivot radius of the pivot arm.

2. Apparatus in accordance with claim 1 wherein the guide rod is rigidly connected with the further horizontal axis of the support frame.

3. Apparatus in accordance with claim 1, wherein the guide rod is arranged substantially at a right angle with respect to the pivot arm in the first and second positions.

4. Apparatus in accordance with claim 1, wherein the pivot arm has a pivot angle in the range of 80 degrees to 100 degrees.

5. Apparatus in accordance with claim 1, wherein the horizontal axis of the pivot arm has a distance to the still further horizontal axis of the guide bushing, and the pivotable end of the pivot arm in the first position has a distance to the position of the pivotable end of the pivot arm in the second position which latter distance corresponds to the distance between the horizontal axis and the still further horizontal axis.

6. Apparatus in accordance with claim 1, and further comprising a pivot support for the guide bushing, the pivot support being lockable and displaceable parallel to the tangent on the pivot radius in the second position of the pivot arm, which tangent extends through the further horizontal axis of the support frame.

7. Apparatus in accordance with claim 1, and further comprising means for adjusting the angle between the guide rod and the plane of the support frame.

8. Apparatus in accordance with claim 1, and further comprising a second pivot arm, the pivot arms being provided at each side of the support frame and being fixedly connected with each other.

9. Apparatus in accordance with claim 8; and further comprising a connecting shaft for fixedly connecting the pivot arms.

* * * * *